(12) United States Patent  
Dettinger et al.

(10) Patent No.: US 7,814,127 B2  
(45) Date of Patent: Oct. 12, 2010

(54) NATURAL LANGUAGE SUPPORT FOR DATABASE APPLICATIONS

(75) Inventors: Richard D. Dettinger, Rochester, MN (US); Frederick A. Kulack, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 1635 days.

(21) Appl. No.: 10/718,218

(22) Filed: Nov. 20, 2003

(65) Prior Publication Data

US 2005/0114329 A1 May 26, 2005

(51) Int. Cl.  
*G06F 17/30* (2006.01)

(52) U.S. Cl. .................... 707/810; 707/809; 707/802

(58) Field of Classification Search .......... 704/4, 704/9, 10; 715/534; 345/748  
See application file for complete search history.

(56) References Cited

U.S. PATENT DOCUMENTS

| | | | | |
|---|---|---|---|---|
| 5,734,887 A | * | 3/1998 | Kingberg et al. | 707/4 |
| 5,787,418 A | * | 7/1998 | Hibbetts et al. | 707/4 |
| 5,950,194 A | * | 9/1999 | Bennett et al. | 707/3 |
| 6,026,388 A | * | 2/2000 | Liddy et al. | 707/1 |
| 6,026,395 A | * | 2/2000 | Bennett et al. | 707/3 |
| 6,345,245 B1 | * | 2/2002 | Sugiyama et al. | 704/10 |
| 6,725,227 B1 | | 4/2004 | Li | |
| 2003/0233224 A1 | * | 12/2003 | Marchisio et al. | 704/4 |
| 2004/0034521 A1 | * | 2/2004 | Kawakura et al. | 704/1 |
| 2004/0046789 A1 | * | 3/2004 | Inanoria | 345/748 |
| 2004/0221235 A1 | * | 11/2004 | Marchisio et al. | 715/534 |
| 2005/0091036 A1 | * | 4/2005 | Shackleton et al. | 704/9 |

OTHER PUBLICATIONS

Dettinger et al., IBM Patent U.S. Appl. No. 10/083,075, filed Feb. 26, 2002, "Application Portability and Extensibility Through Database Schema and Query Abstraction".

\* cited by examiner

*Primary Examiner*—Khanh B Pham  
(74) *Attorney, Agent, or Firm*—Patterson & Sheridan, LLP

(57) ABSTRACT

A method, system and article of manufacture for data processing in databases and, more particularly, for providing natural language support in a database environment. One embodiment provides a method of providing natural language support for users running queries against a database. The method comprises providing a data abstraction model comprising a plurality of logical fields abstractly describing physical data residing in the database, and associating the data abstraction model with a language resource component defining a natural language expression for each of the plurality of logical fields.

40 Claims, 10 Drawing Sheets

NATURAL LANGUAGE SUPPORT FOR DATABASE APPLICATIONS

CROSS-RELATED APPLICATION

This application is related to the following commonly owned application: U.S. patent application Ser. No. 10/083,075, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to data processing in databases and, more particularly, to providing natural language support for database applications.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level database query languages, such as the Structured Query Language (SQL).

One type of functionality that a DBMS must support for end users is natural language support. This includes translation of a given database query language and the data in the database from one language to another and also from one variant of a given language to another variant of the given language. For example, it may be desirable to translate a database from English to Russian and may also be desirable to translate an English database from a format (i.e., variant) suitable to researchers to a format suitable to doctors, where both formats are in the English language.

In conventional database environments, natural language support is provided at the application level. However, it is difficult to provide natural language support for an application as changes are made to the corresponding underlying database. Specifically, if the data in the corresponding underlying database changes, rewriting the natural language support layer of the application is required.

Therefore, there is a need for an improved and more flexible technique for providing natural language support in a database environment.

SUMMARY OF THE INVENTION

The present invention is generally directed to a method, system and article of manufacture for providing natural language support in a database environment and, more particularly, for providing natural language support for users running queries against a database.

One embodiment comprises providing a data abstraction model comprising a plurality of logical fields abstractly describing physical data residing in the database, and associating the data abstraction model with a language resource component defining a natural language expression for each of the plurality of logical fields.

Another embodiment comprises providing a data abstraction model comprising a plurality of logical fields abstractly describing physical data residing in the database, and providing translation information for the data abstraction model describing translations of each of the plurality of logical fields from a first natural language expression to a second natural language expression.

Still another embodiment comprises retrieving an abstract query comprising a plurality of logical fields, each corresponding to a logical field specification of a data abstraction model abstractly describing physical data residing in the database, determining, from the data abstraction model, an associated language resource component, determining, from the associated language resource component, a natural language expression for the plurality of logical fields of the abstract query, and displaying the abstract query in the determined natural language expression.

Still another embodiment provides a computer-readable medium containing a program which, when executed by a processor, performs a process of providing natural language support for users running queries against a database, the process comprising generating a data abstraction model comprising a plurality of logical fields abstractly describing physical data residing in the database, and associating the data abstraction model with a language resource component defining a natural language expression for each of the plurality of logical fields.

Still another embodiment provides a computer-readable medium containing a program which, when executed by a processor, performs a process of providing natural language support for users running queries against a database, the process comprising retrieving a data abstraction model comprising a plurality of logical fields abstractly describing physical data residing in the database, and retrieving translation information for the data abstraction model describing translations of each of the plurality of logical fields from a first natural language expression to a second natural language expression.

Still another embodiment provides a computer-readable medium containing a program which, when executed by a processor, performs a process of providing natural language support for users running queries against a database, the process comprising retrieving an abstract query comprising a plurality of logical fields, each corresponding to a logical field specification of a data abstraction model abstractly describing physical data residing in the database, determining, from the data abstraction model, an associated language resource component, determining, from the associated language resource component, a natural language expression for the plurality of logical fields of the abstract query, and displaying the abstract query in the determined natural language expression.

Yet another embodiment provides a computer system comprising a database having data, and a natural language support manager residing in memory for providing natural language support for users running queries against the data of the database, the natural language support manager being configured for retrieving a data abstraction model comprising a plurality of logical fields abstractly describing physical data residing in the database, and associating the data abstraction model with a language resource component defining a natural language expression for each of the plurality of logical fields.

Yet another embodiment provides a computer system comprising a database having data, and a natural language support manager residing in memory for providing natural language support for users running queries against the data of the database, the natural language support manager being configured for retrieving a data abstraction model comprising a plurality of logical fields abstractly describing physical data residing in the database, and retrieving translation information for the data abstraction model describing translations of each of the plurality of logical fields from a first natural language expression to a second natural language expression.

Yet another embodiment provides a computer system comprising a database having data, and a natural language support manager residing in memory for providing natural language support for users running queries against the data of the database, the natural language support manager being configured for retrieving an abstract query comprising a plurality of logical fields, each corresponding to a logical field specification of a data abstraction model abstractly describing physical data residing in the database, determining, from the data abstraction model, an associated language resource component, determining, from the associated language resource component, a natural language expression for the plurality of logical fields of the abstract query; and displaying the abstract query in the determined natural language expression.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
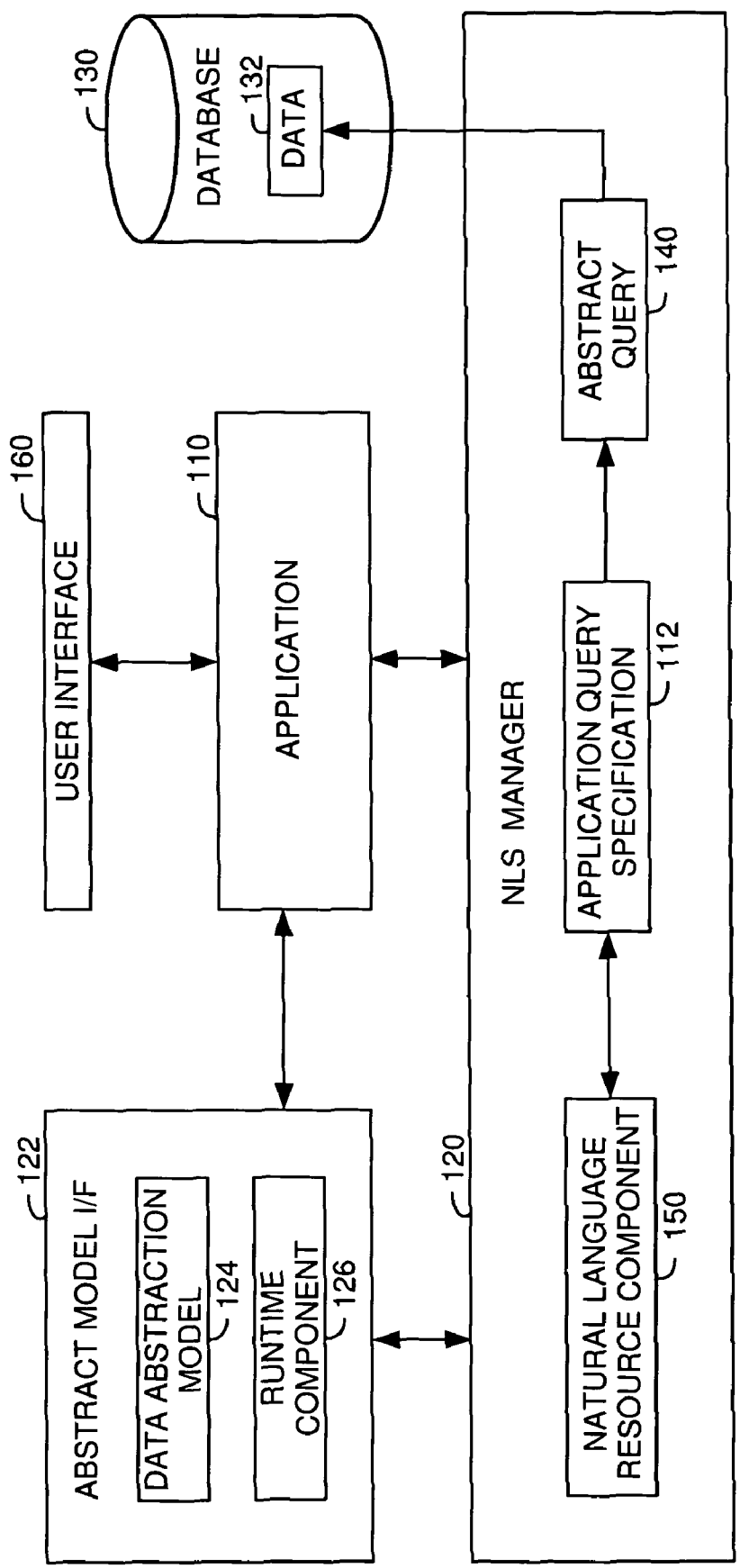
FIG. 1 is a relational view of software components in one embodiment.

The present invention is generally directed to a method, system and article of manufacture for providing natural language support in a database environment and, more particularly, for providing natural language support for users running queries against a database.

In one embodiment, natural language support is provided by a natural language support manager including a natural language resource component. The natural language resource component defines a natural language expression for each of a plurality of logical fields abstractly describing physical data residing in the database. The natural language resource component is associated with a data abstraction model which provides definitions (also referred to herein as "specifications") for the plurality of logical fields. In one embodiment, the natural language resource component provides translation information for the data abstraction model. The translation information describes translations of each of the plurality of logical fields from a first natural language expression (as may be defined in the data abstraction model) to a second natural language expression.

In one embodiment, an abstract query including a plurality of logical fields can be provided. Each of the plurality of logical fields corresponds to a logical field specification of the data abstraction model. The data abstraction model further includes a reference to the associated natural language resource component. Thus, the associated natural language resource component can be determined from the data abstraction model. Furthermore, a natural language expression for the plurality of logical fields of the abstract query can be determined from the associated natural language resource component. The determined natural language expression can be used for displaying the abstract query, including the query's inputs, outputs and conditions.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored thereon Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatuses, single-user workstations, or network appliances that do not have non-volatile storage of their own.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of software components in one embodiment is illustrated. The software components include one or more applications 110 (only one application is illustrated for simplicity), a natural language support (NLS) manager 120, an abstract model interface 122 and a user interface 160.

According to one aspect, the application 110 (and more generally, any requesting entity including, at the highest level, users) issues queries, such as abstract query 140, against data 132 in a database 130. The queries issued by the application 110 are defined according to an application query specification 112. The application query specification(s) 112 and the abstract model interface 122 are further described below with reference to FIGS. 2-5.

The queries issued by the application 110 may be predefined (i.e., hard coded as part of the application 110) or may be generated in response to input (e.g., user input). The user input can be provided via the user interface 160. In one embodiment, the queries (referred to herein as "abstract queries") are composed using logical fields defined by a data abstraction model 124. The abstract queries are transformed into a form consistent with the physical representation of the data 132. For instance, the abstract queries are translated by a runtime component 126 into concrete (i.e., executable) queries which are executed against the data 132 of the database 130. The database 130 is representative of any collection of data regardless of the particular physical representation. By way of illustration, the database 130 may be organized according to a relational schema (accessible by SQL queries) or according to an XML schema (accessible by XML queries). However, the invention is not limited to a particular schema and contemplates extensions to schemas presently unknown. As used herein, the term "schema" generically refers to a particular arrangement of data.

In one embodiment, the NLS manager 120 provides natural language support for users of the data abstraction model 124. Interaction and operation of the application 110, the NLS manager 120 and the abstract model interface 122 to provide natural language support is explained in more detail below with reference to FIGS. 6-9.

Illustratively, the NLS manager 120 includes a natural language resource component 150 (hereinafter referred to as language resource component 150), the application query specification 112 and the abstract query 140. The language resource component 150 defines a natural language expression for user-viewable elements defined by the data abstraction model 124. More specifically, the language resource component may define a natural language expression for each attribute (e.g., name) and/or corresponding value in a logical field. Since the natural language expressions defined by the language resource component 150 may be different from the default natural language expressions defined by the abstraction model 124, the language resource component 150 is considered to provide translation information for the data abstraction model 124. Thus, the translation information describes translations for one or more of the elements (e.g., logical field names, values, etc.) defined by the data abstraction model 124 from a first natural language expression (e.g., the default natural language expressions defined by the abstraction model 124) to a second natural language expression. For a given abstraction model 124, the language resource component 150 may be configured to describe translations from the first natural language expression into two or more natural language expressions. Thus, in one embodiment, which instance of the abstraction model 124 a user "sees" will depend upon which natural language expression files are loaded to define the language resource component 150. In any case, the various natural language expressions can be different languages or different variations on the same language. It is noted that particular embodiments described herein may refer to translation of selected elements of the data abstraction model 124. For example, embodiments may be described with reference to field name translations (e.g., "gender" translated to "sex"). However, references to translations of specific data abstraction model elements is done merely for purposes of illustration and not limiting of the invention. Thus, it is broadly contemplated that any element of the data abstraction model 124 may be translated.

In one embodiment, the language resource component 150 is used for natural language support of users running an abstract query (e.g., abstract query 140) against the data 132 of the database 130. In this case, the language resource component 150 can be used to determine a natural language expression for one or more of the logical fields defined by the data abstraction model 124. Thus, the one or more logical fields can be displayed to the user in the determined natural language expression. Accordingly, the user can compose the abstract query using the one or more logical fields in the displayed natural language expression.

In one embodiment, a previously constructed abstract query can be retrieved from memory for the user. In this case, the abstract query can be displayed according to one or more natural language expressions defined by a language resource component defined for a particular data abstraction model.

Figure 2:
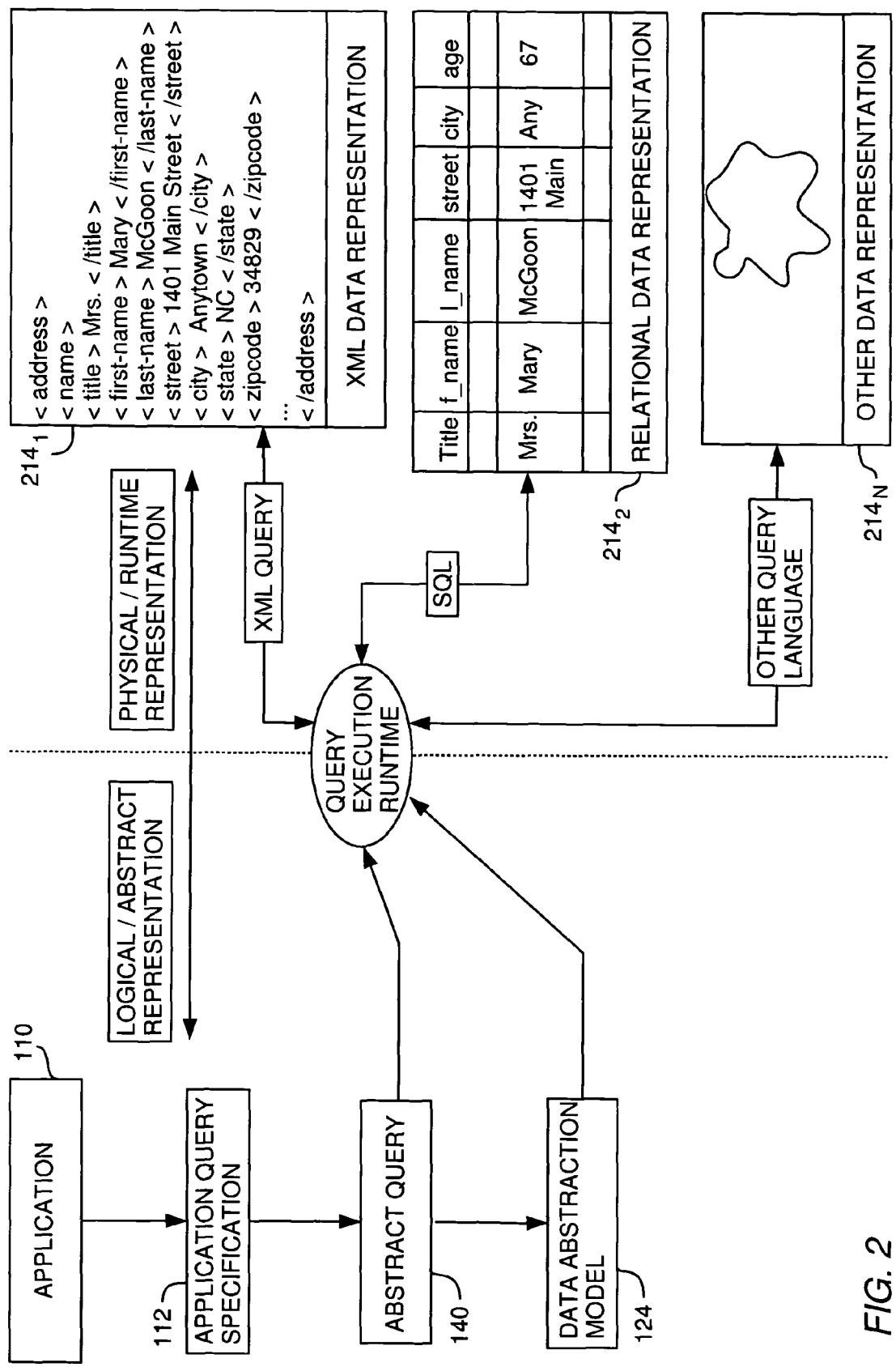
FIGS. 2-3 are relational views of software components for abstract query management.

Referring now to FIG. 2, a relational view illustrating operation and interaction of the application 110 and the abstract model interface 122 is shown. The data abstraction model 124 defines logical fields corresponding to physical entities of data in a database (e.g., database 130), thereby providing a logical representation of the data. In a relational database environment having a multiplicity of database tables, a specific logical representation having specific logical fields can be provided for each database table. In this case, all specific logical representations together constitute the data abstraction model 124. The physical entities of the data are arranged in the database 130 according to a physical representation of the data 132. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model is provided for each separate physical representation 214, as explained above for the case of a relational database environment. In an alternative embodiment, a single data abstraction model 124 contains field specifications (with associated access methods) for two or more physical representations 214.

Figure 3:
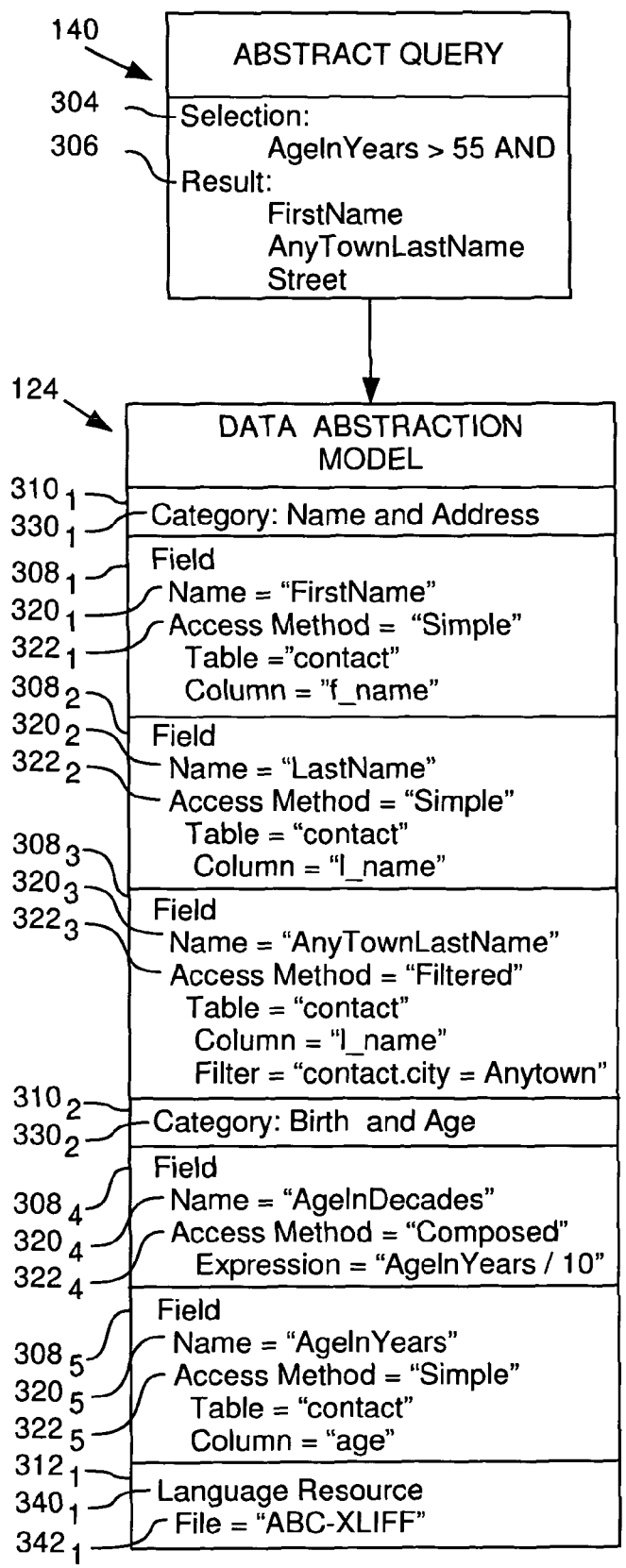

Using a logical representation of the data, the application query specification 112 specifies one or more logical fields to compose the abstract query 140. A requesting entity (e.g., the application 110) issues the abstract query 140 as defined by the application query specification 112. In one embodiment, the abstract query 140 may include both criteria used for data selection and an explicit specification of result fields to be returned based on the data selection criteria. An example of the selection criteria and the result field specification of the abstract query 140 is shown in FIG. 3. Accordingly, the abstract query 140 illustratively includes selection criteria 304 and a result field specification 306.

The abstract query 140 is generally referred to herein as an "abstract query" because the query is composed according to abstract (i.e., logical) fields rather than by direct reference to the underlying physical data entities in the database 130. As a result, abstract queries may be defined that are independent of the particular underlying physical data representation used. For execution, the abstract query 140 is transformed into a concrete query consistent with the underlying physical representation of the data using the data abstraction model 124.

In general, the data abstraction model 124 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

Referring now to FIG. 3, a relational view illustrating interaction of the abstract query 140 and the data abstraction model 124 is shown. In one embodiment, the data abstraction model 124 comprises a plurality of field specifications $308_1$, $308_2$, $308_3$, $308_4$ and $308_5$ (five shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$ (collectively, field names 320) and an associated access method attribute $322_1$, $322_2$, $322_3$, $322_4$, $322_5$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical fields. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, groups (i.e. two or more) of logical fields may be part of categories. Accordingly, the data abstraction model 124 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-5}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-5}$ are part of the "Birth and Age" category.

The access methods 322 generally associate (i.e., map) the logical field names to data in the database (e.g., database 130). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3 maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3 in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3 the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 124 shown in FIG. 3 are representative of logical fields mapped to data represented in the relational data representation $214_2$ shown in FIG. 2. However, other instances of the data abstraction model 124 map logical fields to other physical representations, such as XML.

An illustrative abstract query corresponding to the abstract query 140 shown in FIG. 3 is shown in Table I below. By way of illustration, the illustrative abstract query is defined using XML. However, any other language may be used to advantage.

TABLE I

ABSTRACT QUERY EXAMPLE

| | |
|---|---|
| 001 | <?xml version="1.0"?> |
| 002 | <!--Query string representation: (AgeInYears > "55"--> |
| 003 | <QueryAbstraction> |
| 004 |   <Selection> |
| 005 |     <Condition internalID="4"> |
| 006 |     <Condition field="AgeInYears" operator="GT" value="55" |
| 007 |                 internalID="1"/> |
| 008 |   </Selection> |
| 009 |   <Results> |
| 010 |     <Field name="FirstName"/> |
| 011 |     <Field name="AnyTownLastName"/> |
| 012 |     <Field name="Street"/> |
| 013 |   </Results> |
| 014 | </QueryAbstraction> |

Illustratively, the abstract query shown in Table I includes a selection specification (lines 004-008) containing selection criteria and a results specification (lines 009-013). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

In one embodiment, the abstract query shown in Table I is constructed by an application (e.g., application 110 of FIG. 1). Accordingly, a language resource component (e.g., language resource component 150 of FIG. 1) can be provided which is associated with the data abstraction model 124. The language resource component can be adapted, for instance, to translate elements (e.g., logical field names, values, etc.) of the data abstraction model 124 into the Russian language. Thus, the application may construct the abstract query using the translation of each element in the Russian language. An associated NLS manager (e.g., NLS manager 120 of FIG. 1) can generate an internal representation of the abstract query in a default or untranslated form, i.e., without using the Russian language translations. Thus, the internal representation can be used and accessed by query execution runtime for processing.

In one embodiment, the language resource component associated with the data abstraction model 124 (or at least a file defining a portion of the language resource component) is specified within the data abstraction model 124 itself. Accordingly, the data abstraction model 124 shown in FIG. 3 includes a resource specification 312$_1$. The language resource specification 312$_1$ includes a reference to a particular language resource component (e.g., language resource component 150, or a portion thereof) which is associated with the data abstraction model 124. Illustratively, the language resource specification 312$_1$ includes an abstract attribute 342$_1$ "File" having a language resource file definition 340$_1$. By way of example, the language resource file definition 340$_1$ indicates a corresponding language resource file name "ABC-XLIFF". Additional aspects of an illustrative "ABC-XLIFF" language resource file are described below.

An illustrative Data Abstraction Model (DAM) corresponding to the data abstraction model 124 shown in FIG. 3 is shown in Table II below. By way of illustration, the illustrative data abstraction model is defined using XML. However, any other language may be used to advantage.

TABLE II

DATA ABSTRACTION MODEL EXAMPLE

| | |
|---|---|
| 001 | <?xml version="1.0"?> |
| 002 | <DataAbstraction> |
| 003 |   <Category name="Name and Address"> |
| 004 |     <Field queryable="Yes" name="FirstName" displayable="Yes"> |
| 005 |       <AccessMethod> |
| 006 |         <Simple columnName="f_name" tableName="contact"></Simple> |
| 007 |       </AccessMethod> |
| 008 |     </Field> |
| 009 |     <Field queryable="Yes" name="LastName" displayable="Yes"> |
| 010 |       <AccessMethod> |
| 011 |         <Simple columnName="l_name" tableName="contact"></Simple> |
| 012 |       </AccessMethod> |
| 013 |     </Field> |
| 014 |     <Field queryable="Yes" name="AnyTownLastName" displayable="Yes"> |
| 015 |       <AccessMethod> |
| 016 |         <Filter columnName="l_name" tableName="contact"> |
| 017 |         </Filter="contact.city=Anytown"> |
| 018 |       </AccessMethod> |
| 019 |     </Field> |
| 020 |   </Category> |
| 021 |   <Category name="Birth and Age"> |
| 022 |     <Field queryable="Yes" name="AgeInDecades" displayable="Yes"> |
| 023 |       <AccessMethod> |
| 024 |         <Composed columnName="age" tableName="contact"> |
| 025 |       </Composed Expression="columnName/10"> |
| 026 |       </AccessMethod> |
| 027 |     </Field> |
| 028 |     <Field queryable="Yes" name="AgeInYears" displayable="Yes"> |
| 029 |       <AccessMethod> |
| 030 |         <Simple columnName="age" tableName="contact"></Simple> |
| 031 |       </AccessMethod> |
| 032 |     </Field> |
| 033 |   </Category> |
| 034 |   <LanguageResource file="ABC-XLIFF.xml"> |
| 035 | </DataAbstraction> |

By way of example, note that lines 004-008 correspond to the first field specification 308$_1$ of the DAM 124 shown in FIG. 3 and lines 009-013 correspond to the second field specification 308$_2$. The other field specifications of FIG. 3 are shown in headlines 014-019, 022-027, and 028-032. Furthermore, note that line 034 corresponds to the language resource file definition 340$_1$ of the DAM shown in FIG. 3. More specifically, line 034 includes a reference to an exemplary "ABC-XLIFF.xml" language resource file. In one embodiment, the ABC-XLIFF.xml file defines a base file containing default natural language expressions for a plurality of elements of the data abstraction model 124. One or more additional language resource files may then be loaded and applied to the base file to define a particular view of the data abstraction model 124. Determination of an appropriate language resource file and loading of one or more language resource files associated with a data abstraction model can be performed using conventional techniques applied to the data abstraction model. Examples of determination and loading are explained in more detail below with reference to FIGS. 6-8.

Figure 4:
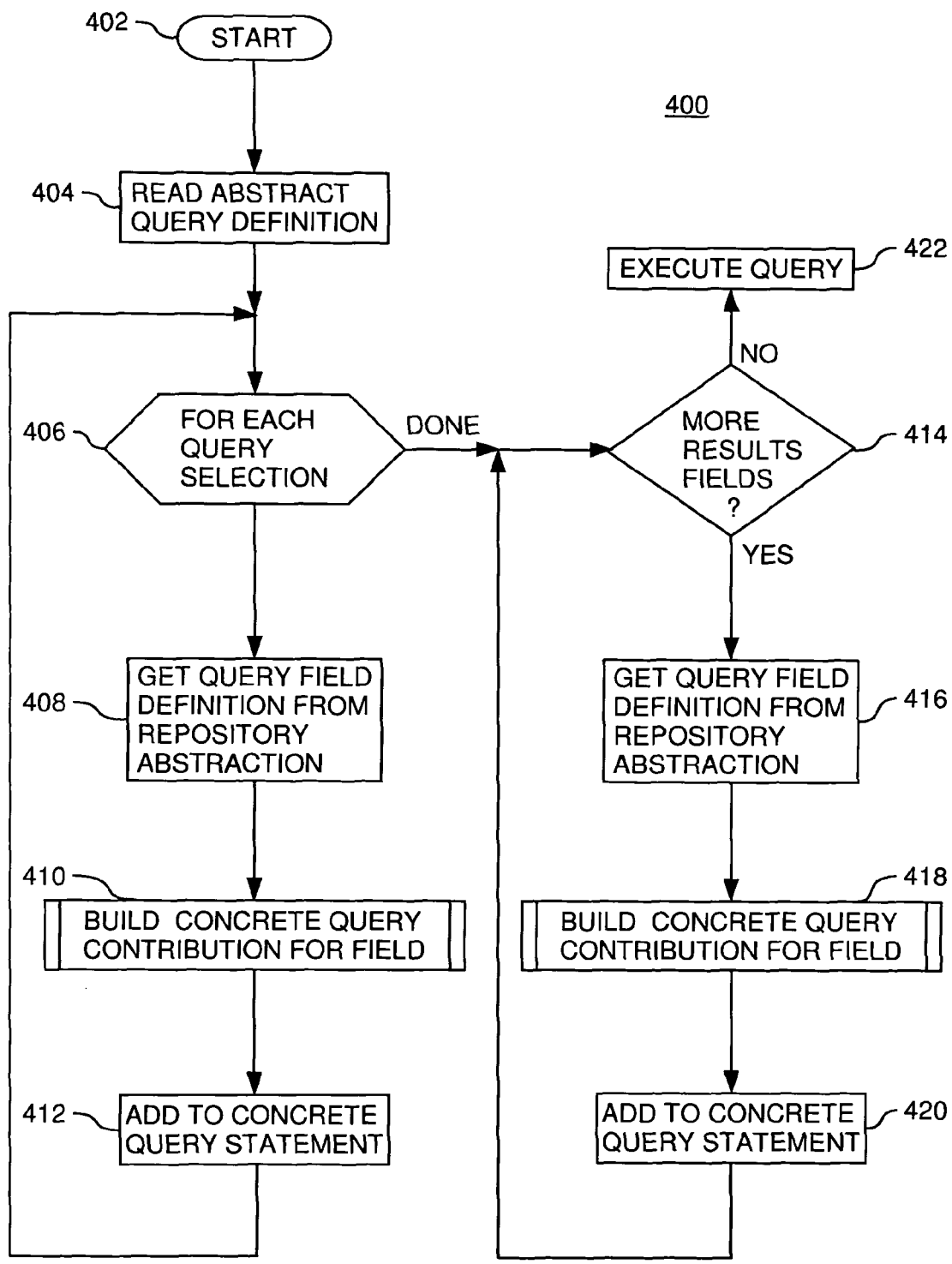
FIGS. 4-5 are flow charts illustrating the operation of a runtime component.

Referring now to FIG. 4, an illustrative runtime method 300 exemplifying one embodiment of the operation of the runtime component 126 is shown. The method 400 is entered at step 402 when the runtime component 126 receives as input an abstract query (such as the abstract query shown in Table I). At step 404, the runtime component 126 reads and parses the abstract query and locates individual selection criteria and desired result fields. At step 406, the runtime component 126 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 126 uses the field name from a selection criterion of the abstract query to look up the definition of the field in the data abstraction model 124. As noted above, the field definition includes a definition of the access method used to access the physical data associated with the field. The runtime component 126 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 126 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 126 looks up a result field name (from the result specification of the abstract query) in the data abstraction model 124 and then retrieves a result field definition from the data abstraction model 124 to identify the physical location of data to be returned for the current logical result field. The runtime component 126 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
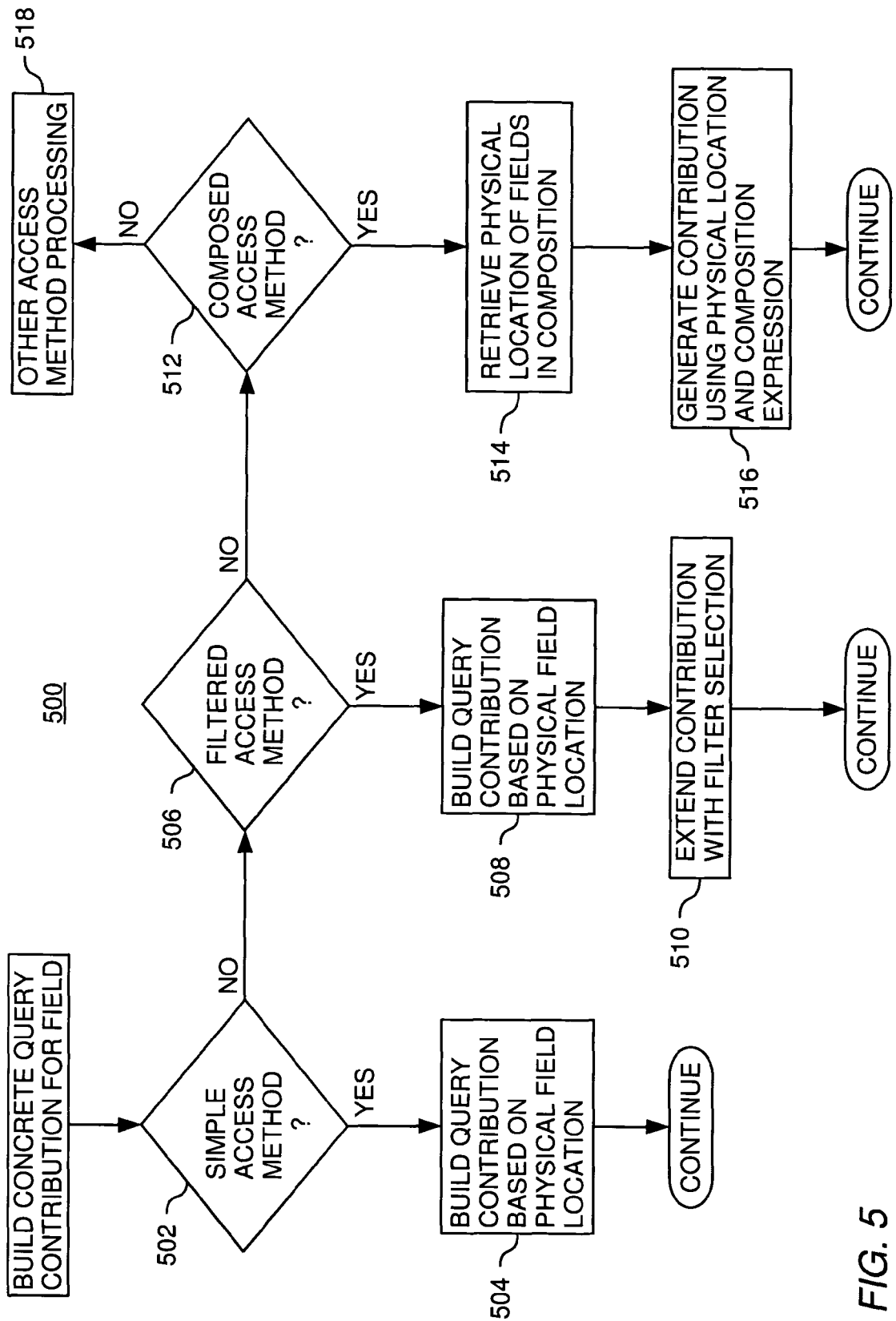

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for some physical data entity. At step 510, the concrete query contribution is extended with additional logic (filter selection) used to subset data associated with the physical data entity. Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

Figure 6:
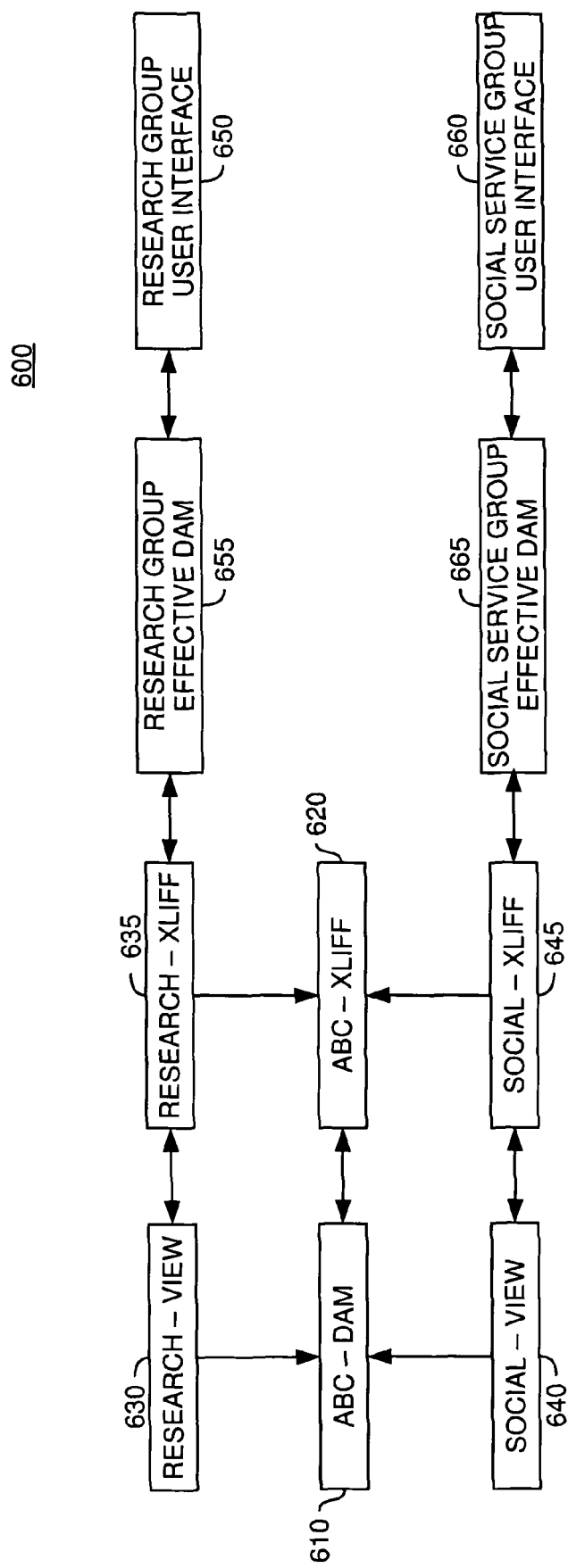
FIG. 6 is a relational view of software components in one embodiment.

Referring now to FIG. 6, a relational view illustrating natural language support for a data abstraction model in accordance with an associated language resource component in one embodiment is shown. More specifically, FIG. 6 shows a data abstraction model "ABC-DAM" 610 (e.g., data abstraction model 124 of FIG. 1) and two different views of the data abstraction model 610. A view of the data abstraction model 610 defines how the data abstraction model 610 is presented to a user. For example, the view may reflect group security settings for a specific group of users. Accordingly, using different views of the data abstraction model 610 according to group security settings, users can be authorized to access information in the data abstraction model 610 based on a corresponding security level assigned to their respective user group. For simplicity, only two views are shown, i.e., a "RESEARCH-VIEW" 630 and a "SOCIAL-VIEW" 640. By way of example, the "RESEARCH-VIEW" 630 defines a view of the data abstraction model 610 for users in a research group and the "SOCIAL-VIEW" 640 defines a view for users in a social service group.

Illustratively, the data abstraction model 610 is associated with a language resource component "ABC-XLIFF" 620. The views 630 and 640 are associated with language resource components "RESEARCH-XLIFF" 635 and "SOCIAL-XLIFF" 645, respectively. In one embodiment, the language resource components 620, 635 and 645 are XLIFF resources. XLIFF (XML Localization Interchange File Format) is an XML based open format designed to capture localizable information (i.e., resources) and to operate with translation tools. Accordingly, the language resource components 620, 635 and 645 can be implemented by XLIFF language resource files (referred to herein as language resource files).

In one embodiment, the language resource file 620 is a default language resource file that includes default natural language expressions for each logical field defined by the data abstraction model 610. In other words, the default language resource file includes all natural language expressions as defined in the data abstraction model 610. However, it should be noted that provision of a default language resource file is optional. Instead of using the default language resource file, all default natural language expressions can be determined directly from the data abstraction model 610. Accordingly, in one embodiment, the language resource file 620 includes natural language expressions which describe translations of each logical field of the data abstraction model 610 into another language or a variation on the same language.

The language resource files 635 and 645 include translations of increasing specificity to replace relatively less specific translations of the language resource file 620. Each of the language resource files 635 and 645 can be used in combination with the language resource file 620 to translate natural language expressions in the data abstraction model 610 according to the views 630 and 640, respectively. Thus, by applying the view 630 and the language resource file 635 (in combination with the language resource file 620) to the data abstraction model 610, an effective data abstraction model "RESEARCH GROUP EFFECTIVE DAM" 655 can be created for a research group user using the "RESEARCH-VIEW" 630. An effective data abstraction model is an in-memory representation of a base data abstraction model (e.g., "ABC-DAM" 610) as modified by applying a view thereto and/or by aggregating multiple data abstraction models into a single larger data abstraction model. The effective data abstraction model 655 can be displayed in a user interface 650. Thus, the user interface 650 is displayed in accordance with the natural language expressions defined by the language resource files 620 and 635. Accordingly, for a social service group user using the "SOCIAL-VIEW" 640, an effective data abstraction model "SOCIAL SERVICE GROUP EFFECTIVE DAM" 665 can be created and displayed in a user interface 660. Thus, the user interface 660 is displayed in accordance with the natural language expressions defined by the language resource files 620 and 645. The data abstraction model 610, the views 630 and 640, the associated language resource files 620, 635 and 645, the effective data abstraction models 655 and 665 and the user interfaces 650 and 660 are explained in more detail below with respect to Tables III-X.

As an example of the data abstraction model "ABC-DAM" 610, the exemplary data abstraction model "ABC-DAM.xml" shown in Table III below is illustrated. For simplicity, elements of the data abstraction model are represented in a shorthand format. Persons skilled in the art will readily recognize corresponding XML representations. Further, for brevity, only parts that are relevant for the following explanations are shown. It is noted that this manner of presentation applies to other tables described below as well.

TABLE III

DATA ABSTRACTION MODEL EXAMPLE

| 001 | ABC-DAM.xml |
| 002 | +---> Demographic: Patient demographic information |
| 003 |    +--> Gender |
| 004 |       +-->Value: Female |
| 005 |       +-->Value: Male |
| 006 |       +-->Value: Unknown |
| 007 |    +--> Name |
| 008 |    +--> SSN: This is the patient's social security number |
| 009 | +---> Diagnosis: Patient diagnostic information |
| 010 |    +--> Disease |
| 011 |       +--> Name |
| 012 | +---> Language Resource |
| 013 |    +--> ABC-XLIFF.xml |

As can be seen from lines 002 and 009, the exemplary data abstraction model includes two categories, i.e., "Demographic" and "Diagnosis". Furthermore, the exemplary data abstraction model includes two "Name" attributes (lines 007 and 011). As can be seen from line 013, the exemplary data abstraction model of Table III is associated with the language resource file "ABC-XLIFF.xml". An exemplary language resource file exemplifying the language resource file "ABC-XLIFF" 620 is shown in Table IV below.

TABLE IV

ABC-XLIFF FILE EXAMPLE

| 001 | ABC-XLIFF.xml |
| 002 | "Demographic.Gender:name" = "Gender" |
| 003 | "Demographic.Gender:val-Female" = "Female" |
| 004 | "Demographic.Gender:val-Male" = "Male" |
| 005 | "Demographic.Gender:val-Unknown" = "Unknown" |
| 006 | "Demographic.Name:name" = "Name" |
| 007 | "Demographic.SSN:description" = "This is the patient's social security number" |
| 008 | "Demographic.SSN:name" = "SSN" |
| 009 | "Demographic:description" = "Patient demographic information" |
| 010 | "Demographic:name" = "Demographic" |
| 011 | "Diagnosis.Disease.Name:name" = "Name" |
| 012 | "Diagnosis.Disease:name" = "Disease" |
| 013 | "Diagnosis:description" = "Patient diagnostic information" |
| 014 | "Diagnosis:name" = "Diagnosis" |

The exemplary XLIFF language resource file of Table IV illustratively includes default natural language expressions for each attribute included in a logical field of the exemplary data abstraction model of Table III. More specifically, the exemplary XLIFF language resource file includes, on the left hand side of each line, a definition for an element (e.g., a logical field name or value) of the data abstraction model and, on the right hand side of each line, an associated value. In other words, the XLIFF language resource file of Table IV includes definition/value mappings for the data abstraction model of Table III. However, as already mentioned above, it should be noted that all information included in the exemplary default language resource file of Table IV is included in and can, thus, be retrieved from, the exemplary data abstraction model of Table III.

As an example of the "RESEARCH-VIEW" 630, an exemplary view of the data abstraction model of Table III for users of a research group is shown in Table V below. Further, for brevity, only parts that are relevant for the following explanations are shown.

TABLE V

RESEARCH-VIEW EXAMPLE

| 001 | RESEARCH-VIEW.xml |
| 002 | +---> Exclude |
| 003 |    +--> Field: SSN |
| 004 | +---> Language Resource |
| 005 |    +--> RESEARCH-XLIFF.xml |

By way of example, it is assumed that researchers should be prevented from seeing Social Security numbers (SSN) for security reasons. Accordingly, as can be seen from line 002, the view of Table V includes an "Exclude" attribute to exclude the logical field "SSN" (line 003) from the presentation of the data abstraction model 610 for display. In other words, the exemplary RESEARCH-VIEW is configured to implement group security settings for users of the RESEARCH group. Furthermore, as can be seen from line 005, the exemplary view of Table V is associated with the language resource file "RESEARCH-XLIFF.xml". An exemplary language resource file exemplifying the language resource file "RESEARCH-XLIFF" 635 is shown in Table VI below.

TABLE VI

RESEARCH-XLIFF FILE EXAMPLE

| | |
|---|---|
| 001 | RESEARCH-XLIFF.xml |
| 002 | "Demographic.Name:name" = "Subject name" |
| 003 | "Demographic:description" = "Demographic" |
| 004 | "Diagnosis.Disease.Name:name" = "Syndrome name" |
| 005 | "Diagnosis:description" = "Diagnostic information" |

As can be seen from lines 002-005, natural language expressions for different definitions of the data abstraction model of Table III are provided, which replace corresponding natural language expressions of the language resource file of Table IV. In other words, it is assumed that researchers would prefer to view the data abstraction model of Table III according to a more technical terminology. Therefore, the natural language expressions shown in Table VI are intended to change the corresponding natural language expressions of Table IV according to a more technical terminology.

By applying the view of Table V and the language resource file of Table VI (in combination with the language resource file of Table IV) to the data abstraction model of Table III, an effective data abstraction model as illustrated in Table VII below can be generated for users of the research group and displayed in the user interface 650. The exemplary effective data abstraction model illustrated in Table VII is an example for the effective data abstraction model 655. For simplicity, only relevant displayed information is illustrated in Table VII.

TABLE VII

RESEARCH GROUP EFFECTIVE DAM EXAMPLE

| | |
|---|---|
| 001 | +---> Demographic: Demographic |
| 002 |     +--> Gender |
| 003 |         +-->Value: Female |
| 004 |         +-->Value: Male |
| 005 |         +-->Value: Unknown |
| 006 |     +--> Subject name |
| 007 | +---> Diagnosis: Diagnostic information |
| 008 |     +--> Disease |
| 009 |         +--> Syndrome name |

As can be seen from Table VII, the SSN information of the data abstraction model of Table III has been excluded. Furthermore, lines 001, 006, 007 and 009 are displayed according to the natural language expressions of the language resource file of Table VI.

As an example of the "SOCIAL-VIEW" 640, an exemplary view of the data abstraction model of Table III for users of a social service group is shown in Table VIII below. Further, for brevity, only parts that are relevant for the following explanations are shown.

TABLE VIII

SOCIAL-VIEW EXAMPLE

| | |
|---|---|
| 001 | SOCIAL-VIEW.xml |
| 002 | +---> IncludeAll |
| 003 | +---> Language Resource |
| 004 |     +--> SOCIAL-XLIFF.xml |

By way of example, it is assumed that social service group users would need to access all information included in the "ABC-DAM" 610. Accordingly, as can be seen from line 002, the view of Table VIII includes an "IncludeAll" attribute to include all logical fields of the data abstraction model 610 for display. Furthermore, as can be seen from line 004, the exemplary view of Table VIII is associated with the language resource file "SOCIAL-XLIFF.xml". An exemplary language resource file exemplifying the language resource file "SOCIAL-XLIFF" 645 is shown in Table IX below.

TABLE IX

SOCIAL-XLIFF FILE EXAMPLE

| | |
|---|---|
| 001 | SOCIAL-XLIFF.xml |
| 002 | "Demographic.Gender:val-Female" = "F" |
| 003 | "Demographic.Gender:val-Male" = "M" |
| 004 | "Demographic.Gender:val-Unknown" = "U" |
| 005 | "Demographic.Name:name" = "Patient name" |
| 006 | "Diagnosis.Disease.Name:name" = "Sickness name" |
| 007 | "Diagnosis:name" = "Likely Illness" |

As can be seen from lines 002-007, natural language expressions for different definitions of the data abstraction model of Table III are provided, which replace corresponding natural language expressions of the language resource file of Table IV. More specifically, it is assumed that social service group users would need to view the data abstraction model of Table III according to a less technical terminology. Therefore, the natural language expressions shown in Table IX are intended to change the corresponding natural language expressions of Table IV accordingly.

According to the view of Table VIII and the language resource file of Table IX (in combination with the language resource file of Table IV), the effective data abstraction model of Table X below can be generated for users of the social service group and displayed in the user interface 660. The exemplary data abstraction model of Table X is an example for the effective data abstraction model 665. For simplicity, only relevant displayed information is illustrated in Table X.

TABLE X

SOCIAL SERVICE GROUP EFFECTIVE DAM EXAMPLE

| | |
|---|---|
| 001 | +---> Demographic: Patient demographic information |
| 002 |     +--> Gender |
| 003 |         +-->Value: F |
| 004 |         +-->Value: M |
| 005 |         +-->Value: U |
| 006 |     +--> Patient name |
| 007 |     +--> SSN: This is the patient's social security number |
| 008 | +---> Likely illness: Patient diagnostic information |
| 009 |     +--> Disease |
| 010 |         +--> Sickness name |

As can be seen from Table X, all information of the data abstraction model of Table III has been included. Furthermore, lines 003-006, 008 and 010 are displayed according to the natural language expressions of the language resource file of Table IX.

Figure 7:
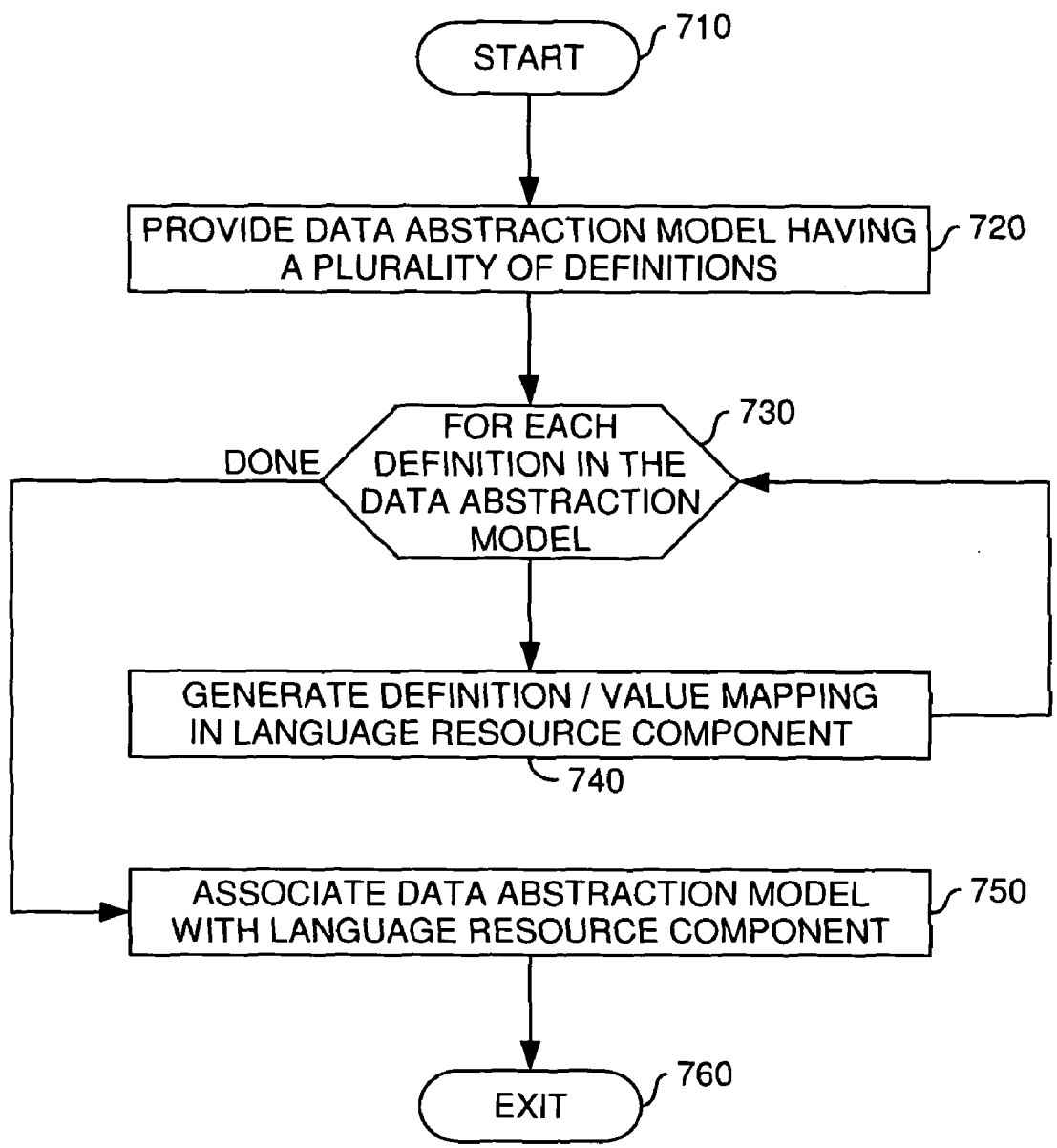
FIGS. 7-9 are flow charts illustrating a method of providing natural language support in a database environment in one embodiment.

Referring now to FIG. 7, a method 700 for providing natural language support for users running queries against a database is illustrated. In one embodiment, the method 700 is performed by the NLS manager 120 of FIG. 1. Method 700 starts at step 710.

At step 720, a data abstraction model (e.g., data abstraction model 610 of FIG. 6) including a plurality of logical fields abstractly describing physical data residing in the database is provided. Each logical field includes one or more attributes. For each attribute, a corresponding definition that uniquely identifies the attribute can be determined from the data abstraction model. At step 730, each definition in the data abstraction model is determined and, at step 740, a corresponding definition/value mapping is generated in a language resource component.

By way of example, for the attribute "Name" in line 007 of the exemplary "ABC-DAM" of Table III, a definition "Demographic.Name:name" is determined. For the attribute "Name" in line 011, a definition "Diagnosis.Disease.Name:name" is determined. Both definitions are mapped to the natural language expression or value "Name" according to lines 007 and 011 of the exemplary "ABC-DAM" of Table III. Furthermore, both definition/value mappings are generated in the exemplary "ABC-XLIFF" language resource file of Table IV (lines 006 and 011, respectively).

The method 700 performs a loop consisting of steps 730 and 740 until a corresponding definition/value mapping has been generated in the language resource component for each definition in the data abstraction model. Thus, the language resource component defines a natural language expression for each of the plurality of logical fields. Subsequently, method 700 proceeds with step 750.

At step 750, the data abstraction model is associated with the generated language resource component. For instance, a language resource file definition is included in the data abstraction model, e.g., language resource file definition "ABC-XLIFF.xml" in line 013 of the exemplary "ABC-DAM" of Table III. Method 700 then exits at step 760.

Figure 8:
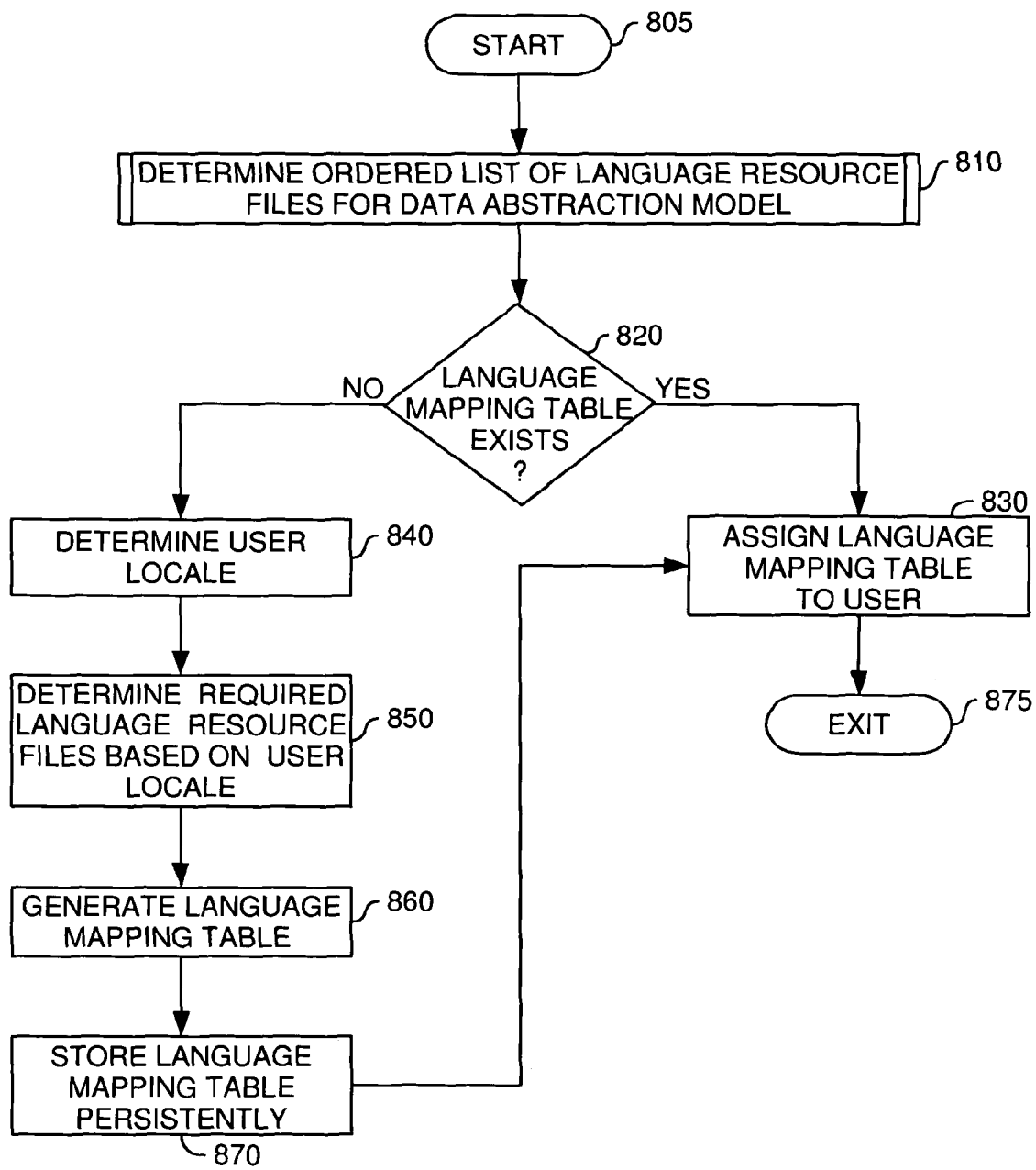

Referring now to FIG. 8, a method 800 illustrating determination of a language mapping table having suitable natural language expressions to be used for a given user is illustrated. The mapping table is determined from corresponding language resource components (e.g., language resource components 620, 635 and 645 of FIG. 6). By way of example, the method 800 is explained with reference to language resource files. In one embodiment, the method 800 is performed by the NLS manager 120 of FIG. 1. Method 800 starts at step 805.

At step 810, an ordered list of the language resource files for a given data abstraction model is determined. Determination of the ordered list is described in more detail below with reference to FIG. 9.

At step 820, a determination is made as to whether a corresponding language mapping table for the user already exists. If the corresponding language mapping table already exists, it is assigned to the user in step 830. Method 800 then exits at step 875. If the corresponding language mapping table does not exist, processing continues at step 840.

At step 840, a user locale is determined. The user locale defines settings concerning, for example, country, language and a language variant used by the user. For instance, the locale may define the user as a researcher of a research group who uses the English language in the United States. In one embodiment, locale is determined according to user input including suitable parameters for determination of all required language resource files using a user interface. In another embodiment, the locale is determined according to local user setting on his/her workstation.

At step 850, all required language resource files are determined for the user based on the determined user locale. For purposes of illustration, it will be assumed that the language resource files of Tables IV and VI are determined for the researcher.

At step 860, using the determined language resource files, a language mapping table is generated for the user. To this end, in one embodiment, all definition/value mappings of the least specific language resource file are included in the language mapping table. For instance, all definition/value mappings of the language resource file of Table IV are initially included in the language mapping table. Subsequently, definition/value mappings of more specific language resource files are used to replace the less specific definition/value mappings of less specific language resource files. This process is performed until all definition/value mappings in the most specific language resource file have been processed. For instance, in the given example, the less specific definition/value mappings from the language resource file of Table IV are replaced by more specific definition/value mappings of the language resource file of Table VI. Accordingly, for the researcher of the research group, the exemplary language mapping table according to Table XI below can be generated.

TABLE XI

| | MAPPING TABLE EXAMPLE |
|---|---|
| 001 | RESEARCH-MAPPING.xml |
| 002 | "Demographic.Gender:name" = "Gender" |
| 003 | "Demographic.Gender:val-Female" = "Female" |
| 004 | "Demographic.Gender:val-Male" = "Male" |
| 005 | "Demographic.Gender:val-Unknown" = "Unknown" |
| 006 | "Demographic.Name:name" = "Subject name" |
| 007 | "Demographic.SSN:description" = "This is the patient's social security number" |
| 008 | "Demographic.SSN:name" = "SSN" |
| 009 | "Demographic:description" = "Demographic" |
| 010 | "Demographic:name" = "Demographic" |
| 011 | "Diagnosis.Disease.Name:name" = "Syndrome name" |
| 012 | "Diagnosis.Disease:name" = "Disease" |
| 013 | "Diagnosis:description" = "Diagnostic information" |
| 014 | "Diagnosis:name" = "Diagnosis" |

As can be seen from Table XI, the exemplary language mapping table represents a combination of the language resource files of Tables IV and VI. The loading and processing of language resource files using locales for file or resource names for generation of a language mapping table is well-known in the art (e.g., by a Java language runtime implementation of resource bundles) and will, therefore, not be described in more detail.

At step 870, the generated language mapping table is persistently stored in memory for use by all users having the same user locale. For instance, the language mapping table of Table XI is persistently stored for all users of the research group. Thus, each time a research group user loads the effective data abstraction model of the research group, the language mapping table can be used for translation purposes. Processing then continues at step 830 as described above.

Figure 9:
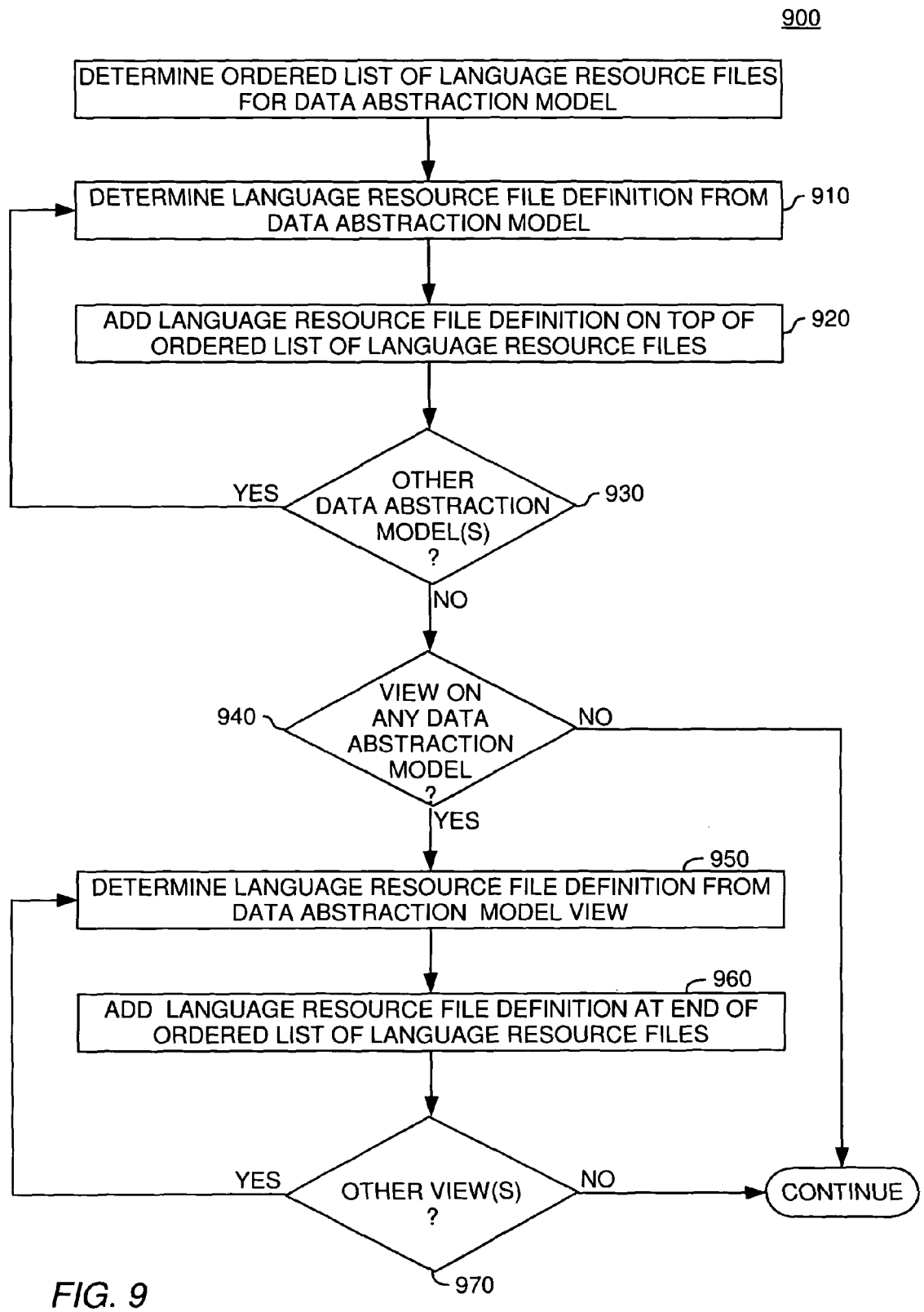

Referring now to FIG. 9, a method 900 illustrating the determination of the ordered list of the language resource files for a given data abstraction model (e.g., data abstraction model 610 of FIG. 6) according to step 810 of FIG. 8 is illustrated. In one embodiment, the ordered list is determined for all users of a given group having common group security settings. Method 900 starts at step 910.

At step 910, a language resource file definition is determined from the data abstraction model. For instance, the language resource file definition "ABC-XLIFF.xml" can be determined from the exemplary data abstraction model of Table III (line 013). At step 920, the determined language resource file definition is added on top of the ordered list of language resource files. At step 930, it is determined whether other data abstraction models exist. If one or more other data abstraction models exist, a next data abstraction model is selected and processing returns to step 910. Accordingly, steps 910 to 930 form a loop which is executed until all data abstraction models have been processed. By way of example, assume that another data abstraction model "DEF-DAM" having a language resource file definition "DEF-XLIFF.xml" exists. Accordingly, the language resource file definition "DEF-XLIFF.xml" is placed on top of the ordered list before the language resource file definition "ABC-XLIFF.xml". When it is determined, at step 930, that no more data abstraction models exist, processing continues at step 940.

At step 940, it is determined whether one or more views on one or more data abstraction models, which have been processed in the loop formed of steps 910 to 930, exist. If no view exists, processing continues at step 820 of FIG. 8. If, however, one or more views exist, a language resource file definition from a first view is determined at step 950. For instance, the language resource file definition "RESEARCH-XLIFF.xml" can be determined from the exemplary view of Table V (line 005). At step 960, the determined language resource file definition is added at the end of the ordered list. At step 970, it is determined whether other views exist. If one or more other views exist, a next view is selected and processing returns to step 950. Accordingly, steps 950 to 970 form a loop which is executed until all views have been processed. In one embodiment, step 970 includes determining whether other views exist for a given group of users. For instance, it is determined whether other views exist for the research group users. In the given example no additional views for research group users can be determined, but a view for social service group users can be determined. By way of example, the "SOCIAL-VIEW" of Table VIII includes the language resource file definition "SOCIAL-XLIFF.xml" (line 004). However, in the given example it is assumed that the views of the research group and the social service group have different group security settings and are mutually exclusive. Therefore, the language resource file definition "SOCIAL-XLIFF.xml" is not processed. However, if the views of the research group and the social service had been construed with common group security settings, the language resource file definition "SOCIAL-XLIFF.xml" would have been placed at the end of the ordered list behind the language resource file definition "RESEARCH-XLIFF.xml". When it is determined, at step 970, that no more views exist, processing continues at step 820 of FIG. 8.

In one embodiment, the loop formed of steps 950 to 970 is performed for views of different specificity levels. In other words, after processing a first view at a lowest specificity level, views of higher specificity levels up to views having the highest specificity level can be processed before a next view at the lowest specificity level is processed. It should be noted that identical processing can be performed for the data abstraction models by the loop formed of steps 910 to 930. For instance, assume that a view for a Russian research group having a language resource file definition "RESEARCH-XLIFF_RU.xml" exists. Assume further that a view for a Russian research group of a region BB exists, which requires a more specific terminology and which has a language resource file definition "RESEARCH-XLIFF_RU_BB.xml". Accordingly, the language resource file definition "RESEARCH-XLIFF_RU.xml" would be processed after the language resource file definition "RESEARCH-XLIFF.xml", and the language resource file definition "RESEARCH-XLIFF_RU_BB.xml" would be processed at the end. Accordingly, the language resource file definition "RESEARCH-XLIFF_RU_BB.xml" would be placed at the end of the ordered list. The following Table XII exemplifies an ordered list according to the above example.

TABLE XII

ORDERED LIST EXAMPLE

| | |
|---|---|
| 001 | DEF-XLIFF.xml |
| 002 | DEF-XLIFF_RU.xml |
| 003 | DEF-XLIFF_RU_BB.xml |
| 004 | ABC-XLIFF.xml |
| 005 | ABC-XLIFF_RU.xml |
| 006 | ABC-XLIFF_RU_BB.xml |
| 007 | RESEARCH-XLIFF.xml |
| 008 | RESEARCH-XLIFF_RU.xml |
| 009 | RESEARCH-XLIFF_RU_BB.xml |

It should be noted that Table XII includes language resource file definitions for the data abstraction models "DEF-DAM" (lines 001-003) and "ABC-DAM" (lines 004-006) with specificity levels that correspond to the specificity levels of the "RESEARCH-VIEW" of Table V as explained above. In other words, it is assumed that a general Russian translation (lines 002 and 005) and a more specific Russian translation for a region BB (lines 003 and 006) are also provided for each of the data abstraction models. "DEF-DAM" and "ABC-DAM".

Figure 10:
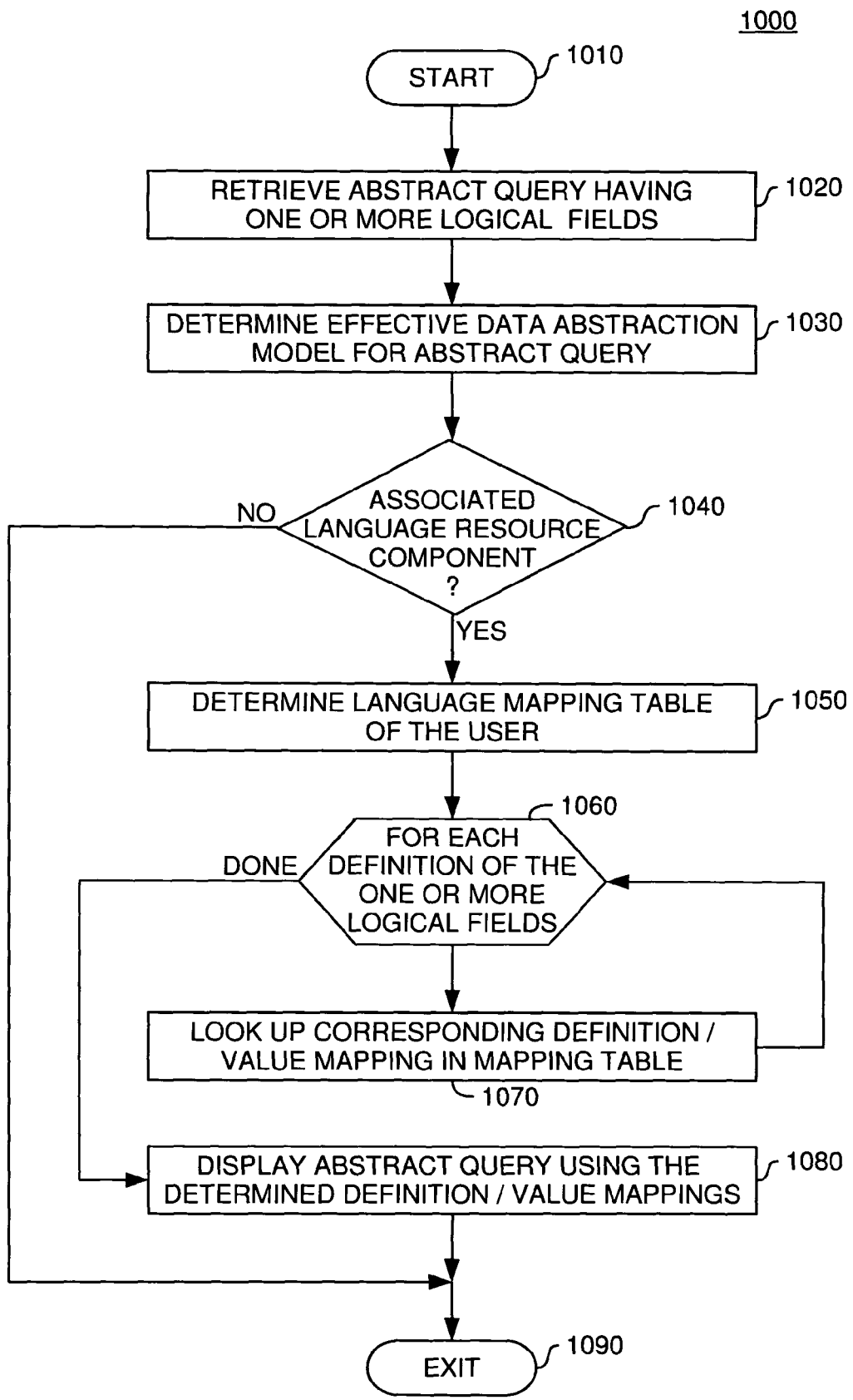
FIG. 10 is a flow chart illustrating a method of providing natural language support for users running queries against a database in one embodiment.

Referring now to FIG. 10, one embodiment of a method 1000 of providing natural language support for users running queries against a database is illustrated. At least a portion of the steps of method 1000 can be performed by the NLS manager 120 of FIG. 1. Method 1000 starts at step 1010.

At step 1020, an abstract query (e.g., abstract query 140 of FIG. 1) including one or more logical fields, each corresponding to a logical field specification of a data abstraction model (e.g., data abstraction model 124 of FIG. 1 or data abstraction model 610 of FIG. 6) abstractly describing physical data residing in a database (e.g., database 130 of FIG. 1) is retrieved. At step 1030, the data abstraction model is determined. This determination can be performed by a database application (e.g., application 110 of FIG. 1) that is configured to access the data abstraction model and has corresponding knowledge of which data abstraction model(s) to use. Furthermore, based on security settings for users and user and group information for a corresponding user, applicable views can be determined by the application. At step 1040, it is determined, from the data abstraction model, whether an associated language resource component (e.g., language resource file 620 of FIG. 6) exists. If no associated language resource component exists, the method 1000 exits at step 1090. If, however, an associated language resource component exists, processing continues at step 1050.

At step 1050, a corresponding language mapping table is determined for the user. Determination of the language mapping table is performed, in one embodiment, according to the method 800 of FIG. 8. The method 1000 then enters a loop consisting of steps 1060 and 1070. The loop is performed for each attribute of each logical field of the abstract query to determine a natural language expression for the logical field (s) of the abstract query. More specifically, for each attribute of each logical field, a corresponding definition is determined at step 1060. Then, at step 1070, a corresponding definition/value mapping is looked up in the language mapping table. When all attributes have been processed, processing continues at step 1080.

At step 1080, the abstract query is displayed in the determined natural language expression. More specifically, each attribute in the abstract query is replaced by a determined value from a corresponding definition/value mapping from the language mapping table for display. Method 1000 then exits at step 1090.

In various embodiments, the invention provides numerous advantages over the prior art. For instance, in one embodiment a language resource file can be constructed from a given data abstraction model. The language resource file may include default natural language expressions for use in representing attributes of the data abstraction model to the user. The default language resource file can be translated into any foreign languages or variants on a same language such as alternative terminology required by users or groups of users that access the data abstraction model. At startup/load time, the abstract database configures the data abstraction model or a given view with corresponding language resource file(s) that will be used. At user login time, the abstract database determines user parameters for the user, such as from a user locale, and which translated resources are used for representing the data abstraction model.

In one embodiment, translation information and characteristics are moved to the data abstraction model itself so that applications are not concerned with the translation. It is contemplated that the applications themselves may continue to use language resource lookup and translation according to the conventional model for their own resources. However, since the data abstraction model itself supports translations, additional capabilities beyond simple language translation of resources are made possible. For instance, basic constructs of the database can be translated, not just user application data. For example, field names used for comparison or database output can be automatically translated. Furthermore, database queries can be stored without translation, allowing a user of one language to write and save queries that a user in another language can load and run using the natural language support. Thus, the language of any given user constructing or modifying a query is made irrelevant as any user can view and understand the query and the results of the query in his or her desired language. In one embodiment, the database infrastructure is used to choose translation characteristics. The database has knowledge of a user's security settings, so that the user gets a certain authorization when logging in. That authorization is the basis for assigning a view of the data abstraction model to the user. The specification of the view includes translation information that is unrelated to a specific language or terminology. Then, if for instance English clerks/administrators, managers and researchers all use the same database and queries, they do not only get different views of the data, but using the natural language support each one may get the data translated into language and/or terminology appropriate for his/her skill level.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A method of providing natural language support for users running queries against a database, comprising:
   providing a data abstraction model comprising a plurality of logical fields abstractly describing physical data residing in the database;
   associating the data abstraction model with a language resource component defining a natural language expression for each of the plurality of logical fields;
   creating an effective data abstraction model by modifying the data abstraction model in accordance with a view that reflects one or more security settings for a group of users; and
   displaying, to a user of the group of users, the effective data abstraction model.

2. The method of claim 1, further comprising:
   creating the language resource component for the data abstraction model, the creating comprising mapping a default value to each logical field of the plurality of logical fields.

3. The method of claim 1, wherein the associating comprises:
   generating, in the data abstraction model, a reference to the language resource component to associate the data abstraction model with the language resource component.

4. The method of claim 3, wherein the associated language resource component is an XML Localization Interchange File Format resource.

5. A method of providing natural language support for users running queries against a database, comprising:
   providing a data abstraction model comprising a plurality of logical fields abstractly describing physical data residing in the database;
   providing translation information for the data abstraction model describing translations of each of the plurality of logical fields from a first natural language expression to two or more second natural language expressions; and
   displaying one of the second natural language expressions to a user, wherein which of the two or more second natural language expressions is displayed depends upon which natural language expression files are loaded to define a language resource component associated with the data abstraction model.

6. The method of claim 5, wherein the first and second natural language expressions are two different languages.

7. The method of claim 5, wherein the first and second natural language expressions are two different variations on the same language.

8. The method of claim 5, wherein providing translation information comprises providing an XML Localization Interchange File Format resource.

9. The method of claim 5, wherein the data abstraction model further comprises a reference to at least a portion of the translation information.

10. The method of claim 9, wherein the referenced portion is a default file.

11. The method of claim 5, wherein providing translation information comprises successively loading language resource files, wherein each successive language resource file comprises translations of increasing specificity to replace relatively less specific translations of one or more previously loaded language resource files.

12. The method of claim 5, wherein the translation information further describes translations of each of the plurality of logical fields from the first natural language expression to a third natural language expression, and further comprising:
   displaying, to a user, at least a portion of the data abstraction model using only one of the first natural language expression, one of the two or more second natural language expression and the third natural language expression.

13. The method of claim 12, wherein which language expression is used to display the portion of the data abstraction model is based on user parameters.

14. The method of claim 13, wherein the user parameters describe a context of the user.

15. The method of claim 5, further comprising:
retrieving an abstract query expressed in the first natural language expression;
translating the abstract query on the basis of the translation information to express the abstract query in the second natural language expression; and
displaying the abstract query expressed in the second natural language expression.

16. A method of providing natural language support for users running queries against a database, comprising:
retrieving an abstract query comprising a plurality of logical fields, each corresponding to a logical field specification of a data abstraction model abstractly describing physical data residing in the database;
determining, from the data abstraction model, an associated language resource component;
determining, from the associated language resource component, at least two natural language expressions for the plurality of logical fields of the abstract query; and
displaying the abstract query in one of the at least two determined natural language expressions to a user, wherein the natural language expression displayed is determined by a security setting of the user.

17. The method of claim 16, further comprising, prior to displaying the abstract query, translating the abstract query from another natural language expression in which the abstract query was initially written.

18. The method of claim 16 wherein the associated language resource component is a language resource file, the data abstraction model including a reference to the language resource file.

19. A computer-readable medium containing a program which, when executed by a processor, performs a process of providing natural language support for users running queries against a database, the process comprising:
generating a data abstraction model comprising a plurality of logical fields abstractly describing physical data residing in the database;
associating the data abstraction model with a language resource component defining a natural language expression for each of the plurality of logical fields;
creating an effective data abstraction model by modifying the data abstraction model in accordance with the a view that reflects one or more security settings for a group of users; and
displaying, to a user of the group of users, the effective data abstraction model.

20. The computer-readable medium of claim 19, wherein the process further comprises:
displaying, to a user, at least a portion of the data abstraction model in accordance with the natural language expression defined by the language resource component.

21. The computer-readable medium of claim 19, wherein the process further comprises:
creating the language resource component for the data abstraction model, the creating comprising mapping a default value to each logical field of the plurality of logical fields.

22. The computer-readable medium of claim 19, wherein the associating comprises:
generating, in the data abstraction model, a reference to the language resource component to associate the data abstraction model with the language resource component.

23. The computer-readable medium of claim 22, wherein the associated language resource component is an XML Localization Interchange File Format resource.

24. A computer-readable medium containing a program which, when executed by a processor, performs a process of providing natural language support for users running queries against a database, the process comprising:
retrieving a data abstraction model comprising a plurality of logical fields abstractly describing physical data residing in the database;
retrieving translation information for the data abstraction model describing translations of each of the plurality of logical fields from a first natural language expression to a second natural language expression;
creating an effective data abstraction model by modifying the data abstraction model in accordance with the translation information and a view that reflects one or more security settings for a group of users; and
displaying, to a user of the group of users, the effective data abstraction model.

25. The computer-readable medium of claim 24, wherein the first and second natural language expressions are two different languages.

26. The computer-readable medium of claim 24, wherein the first and second natural language expressions are two different variations on the same language.

27. The computer-readable medium of claim 24, wherein retrieving translation information comprises retrieving an XML Localization Interchange File Format resource.

28. The computer-readable medium of claim 24, wherein the data abstraction model further comprises a reference to at least a portion of the translation information.

29. The computer-readable medium of claim 28, wherein the referenced portion is a default file.

30. The computer-readable medium of claim 24, wherein retrieving translation information comprises successively loading language resource files, wherein each successive language resource file comprises translations of increasing specificity to replace relatively less specific translations of one or more previously loaded language resource files.

31. The computer-readable medium of claim 24, wherein the translation information further describes translations of each of the plurality of logical fields from the first natural language expression to a third natural language expression, and the process further comprising:
displaying, to a user, at least a portion of the data abstraction model using only one of the first natural language expression, the second natural language expression and the third natural language expression.

32. The computer-readable medium of claim 31, wherein which language expression is used to display the portion of the data abstraction model is based on user parameters.

33. The computer-readable medium of claim 32, wherein the user parameters describe a context of the user.

34. The computer-readable medium of claim 24, wherein the process further comprises:
retrieving an abstract query expressed in the first natural language expression;
translating the abstract query on the basis of the translation information to express the abstract query in the second natural language expression; and
displaying the abstract query expressed in the second natural language expression.

35. A computer-readable medium containing a program which, when executed by a processor, performs a process of providing natural language support for users running queries against a database, the process comprising:

retrieving an abstract query comprising a plurality of logical fields, each corresponding to a logical field specification of a data abstraction model abstractly describing physical data residing in the database;

determining, from the data abstraction model, an associated language resource component;

determining, from the associated language resource component, at least two natural language expressions for the plurality of logical fields of the abstract query; and displaying the abstract query in one of the at least two determined natural language expressions to a user, wherein the natural language expression displayed is determined by a security setting of the user.

36. The computer-readable medium of claim 35, wherein the process further comprises, prior to displaying the abstract query, translating the abstract query from another natural language expression in which the abstract query was initially written.

37. The computer-readable medium of claim 35 wherein the associated language resource component is a language resource file, the data abstraction model including a reference to the language resource file.

38. A computer system, comprising:
a database having data; and
a natural language support manager residing in memory for providing natural language support for users running queries against the data of the database, the natural language support manager being configured for:
retrieving a data abstraction model comprising a plurality of logical fields abstractly describing physical data residing in the database;
associating the data abstraction model with a language resource component defining a natural language expression for each of the plurality of logical fields;
creating an effective data abstraction model by modifying the data abstraction model in accordance with the translation information and a view that reflects one or more security settings for a group of users; and
displaying, to a user of the group of users, the effective data abstraction model.

39. A computer system, comprising:
a database having data; and
a natural language support manager residing in memory for providing natural language support for users running queries against the data of the database, the natural language support manager being configured for:
retrieving a data abstraction model comprising a plurality of logical fields abstractly describing physical data residing in the database;
retrieving translation information for the data abstraction model describing translations of each of the plurality of logical fields from a first natural language expression to a second natural language expression;
creating an effective data abstraction model by modifying the data abstraction model in accordance with the translation information and a view that reflects one or more security settings for a group of users; and
displaying, to a user of the group of users, the effective data abstraction model.

40. A computer system, comprising:
a database having data; and
a natural language support manager residing in memory for providing natural language support for users running queries against the data of the database, the natural language support manager being configured for:
retrieving an abstract query comprising a plurality of logical fields, each corresponding to a logical field specification of a data abstraction model abstractly describing physical data residing in the database;
determining, from the data abstraction model, an associated language resource component;
determining, from the associated language resource component, at least two natural language expressions for the plurality of logical fields of the abstract query; and
displaying the abstract query in one of the at least two determined natural language expressions to a user, wherein the natural language expression displayed is determined by a security setting of the user.

* * * * *